INVENTOR.
B. F. IVES
BY *Young & Quigg*
ATTORNEYS

INVENTOR.
B. F. IVES
BY
Young & Quigg
ATTORNEYS

INVENTOR.
B. F. IVES
BY
Young & Quigg
ATTORNEYS

United States Patent Office 3,524,305

Patented Aug. 18, 1970

3,524,305
MINIMIZING SWITCHING TRANSIENTS IN MULTIPLE COLUMN CHROMATOGRAPHY

Brian F. Ives, Bartlesville, Okla., assignor to Phillips Petroleum Company, a corporation of Delaware Filed Dec. 26, 1967, Ser. No. 693,231
Int. Cl. B01d 15/08
U.S. Cl. 55—386 2 Claims

ABSTRACT OF THE DISCLOSURE

A buffer element is positioned between the outlet of a multiple column array and the chromatographic detector to minimize the effects on the detector of transients produced by switching the columns into a different arrangement. The buffer element can be a column filled with inert packing material or a capillary tube, but in either case is substantially free of any material which would effect a chromatographic separation. The effective free cross sectional area of the buffer element is equal to, or preferably less than, the effective free cross sectional area of the chromatographic column array.

The invention relates to chromatographic analysis utilizing a multiple column array wherein the arrangement of the columns in the array is altered during an analysis. Such systems include the alteration of the order of the columns in a serial array, the removal of one or more columns from the array for backflushing or elution to a different detector or to a vent, or reversing the connection of a column. When such an alteration occurs, during the analysis, the resulting switching transient in the pressure of the effluent going to the detector causes a corresponding deviation in the baseline for the detector output. The occurrence of the baseline deviation during the presence of a component in the detector makes the resulting output signal inaccurate for either a peak height signal or an integrated peak area signal.

It has been found that these difficulties can be avoided or at least minimized through the utilization of a buffer element between the output of the column array and the chromatographic detector. The buffer element can be a column filled with inert packing material or a capillary tube, but in either case is substantially free of any material which would effect a chromatographic separation. The effective free cross sectional area of the buffer element is equal to, or preferably less than, the effective free cross sectional area of the chromatographic column array. The term effective free cross sectional area represents the internal cross sectional area of the element less the cross sectional area occupied by packing material, if any.

Accordingly, it is an object of the invention to provide an improved multiple column chromatographic analyzer. It is an object of the invention to minimize the effects of switching transients in a multiple column array during an analysis. It is an object of the invention to provide a more accurate output signal from a multiple column chromatographic analyzer. Another object of the invention is to minimize deviations in the baseline of a detector output in a chromatographic analyzer.

Other objects, aspects and advantages of the invention will be apparent from a study of the specification, the drawings and the appended claims to the invention.

Figure 1:
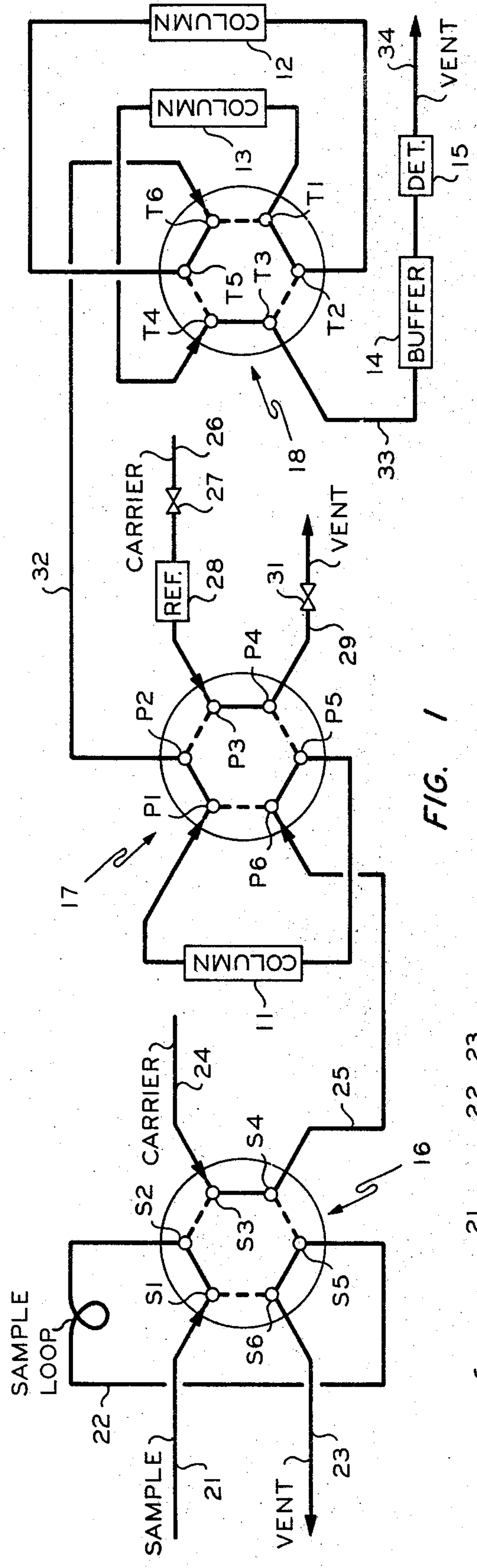
Figure 5:
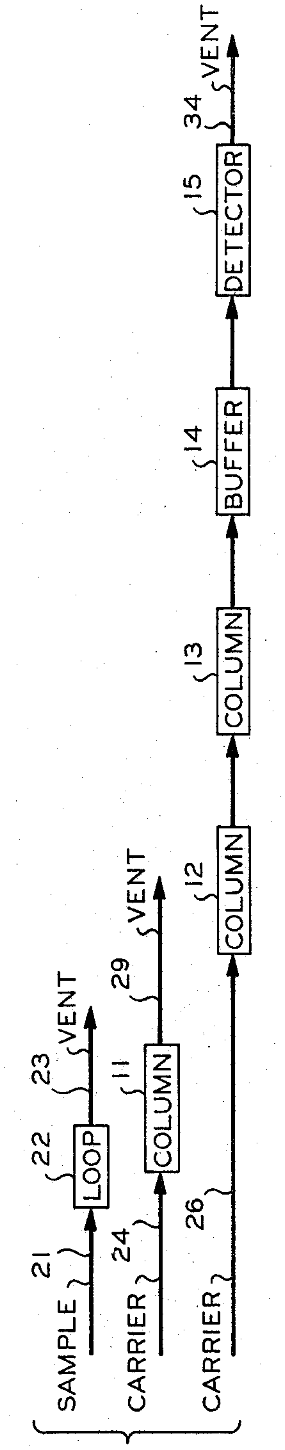
Figure 6:
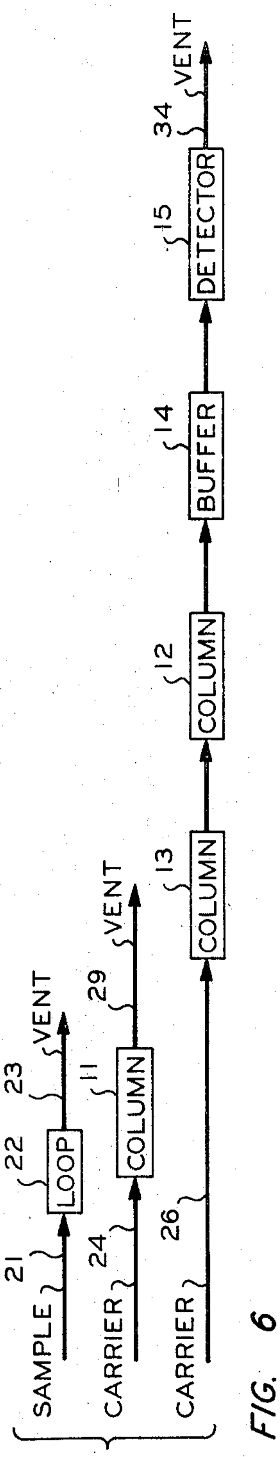
Figure 8:
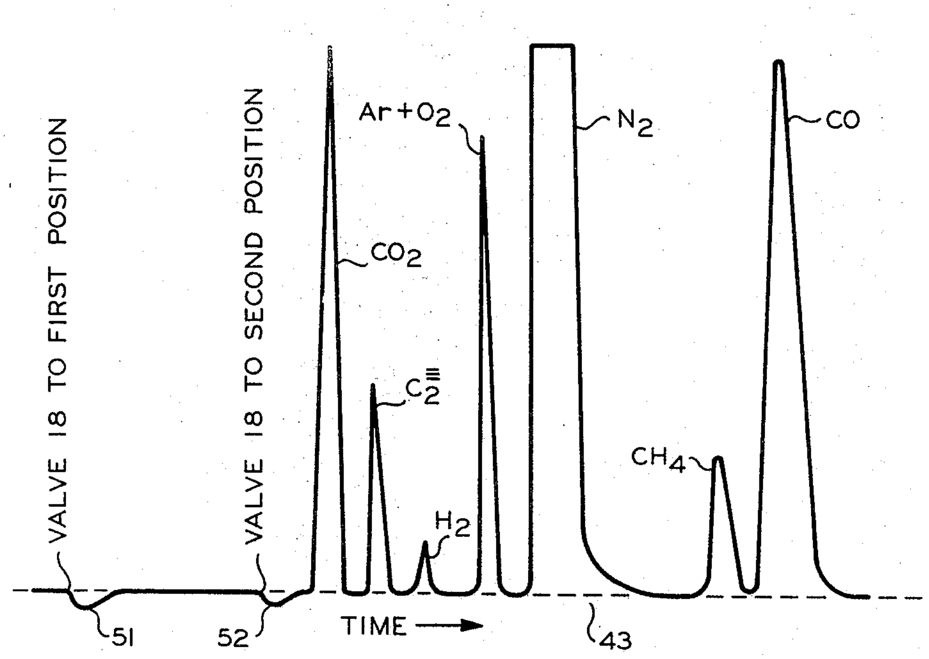
Figure 7:
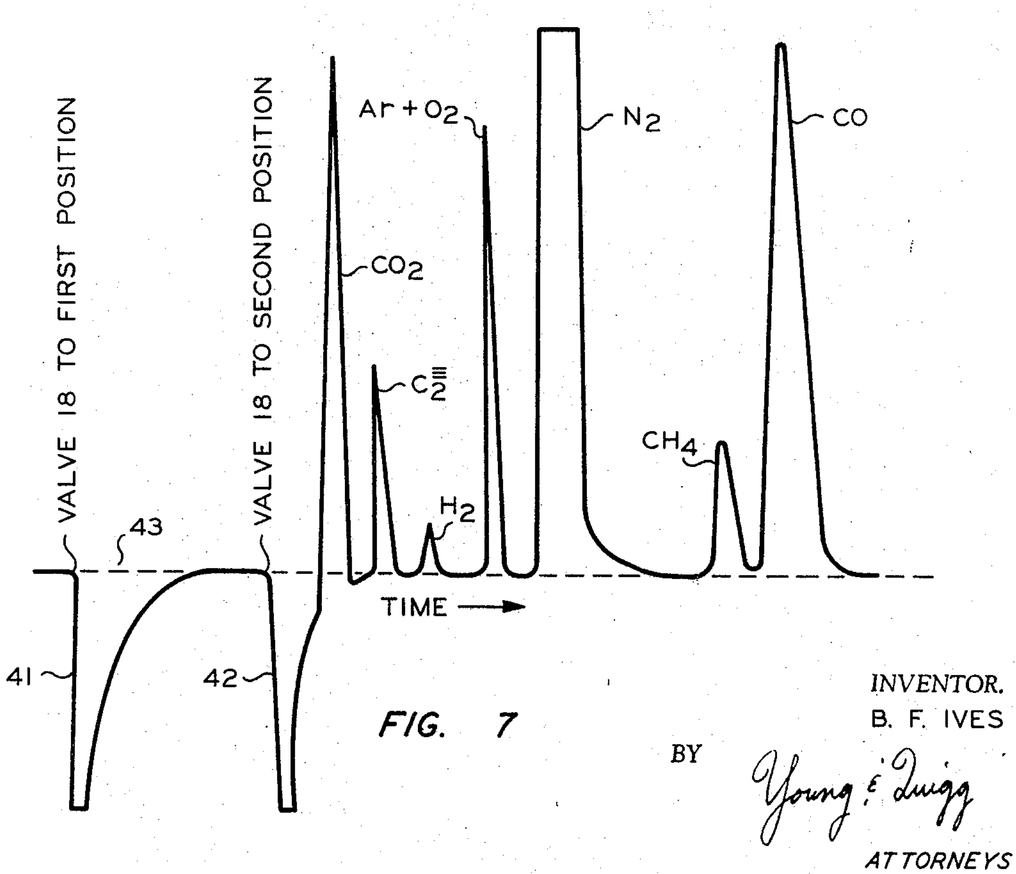

In the drawings, FIG. 1 is a schematic representation of a chromatographic analyzer utilizing a multiple column array and incorporating a buffer element in accordance with the invention; FIGS. 2–6 are diagrammatic representations of the flow paths at various times in the system of FIG. 1; FIG. 7 is a graphical representation of an analysis output of the detector of the system of FIG. 1 without the buffer element; and FIG. 8 is a graphical representation of the output of the detector of the system of FIG. 1 including the buffer element fo rthe same analysis represented in FIG. 7.

Referring now to FIG. 1, there is illustrated a chromatographic analysis system utilizing chromatographic colums 11, 12 and 13, buffer element 14, detector 15 and valves 16, 17 and 18. Valves 16, 17 and 18 are six port, two position valves of the type illustrated in A. B. Broerman, U.S. Pat. 3,140,615, issued July 14, 1964.

Sample of the material to be analyzed is supplied through conduit 21 to part S1 of valve 16, which serves as the sample valve. A sample loop 22 is connected between ports S2 and S5 while port S6 is connected to a vent conduit 23. Carrier gas is supplied through conduit 24 to port S3, while the outlet port S4 is connected by way of conduit 25 to inlet port P6 of valve 17. Chromatographic column 11 is connected between ports P1 and P5 of valve 17. Carrier gas is supplied through conduit 26, containing valve 27 and reference cell 28, to port P3. Conduit 29, containing valve 31, is connected between port P4 and vent. Outlet port P2 is connected through conduit 32 to inlet port T6 of valve 18. Column 12 is connected between ports T2 and T5, while column 13 is connected between ports T1 and T4 of valve 18. Outlet ports T3 is connected by conduit 33 to the inlet of buffer element 14. The outlet of buffer element 14 is connected to the inlet of detector 15, while the outlet of detector 15 is connected through conduit 34 to vent. Columns 11, 12 and 13 contain material that selectively retards passage therethrough of constituents of the fluid sample mixture. This material can be in the form of a solid sorbent, a liquid sorbent coating on packing material particles, or a liquid sorbent coating on the inner wall of the column. Buffer element 14 can contain inert packing material particles or be in the form of a capillary tube, but is substantially free of any material which would effect significant separation of the constituents of the fluid mixture passing therethrough. The effective cross sectional area of buffer element 15 is preferably less than the effective free cross sectional area of columns 11, 12 and 13 to act as a flow restriction and to promote plug flow through buffer element 14. A larger effective free cross sectional area would permit undesirable mixing of the fluid components passing therethrough. Reference cell 28 and detection or measuring cell 15 can be connected in any of the detection systems known in the art, for example in a Wheatstone bridge detection network.

Figure 2:
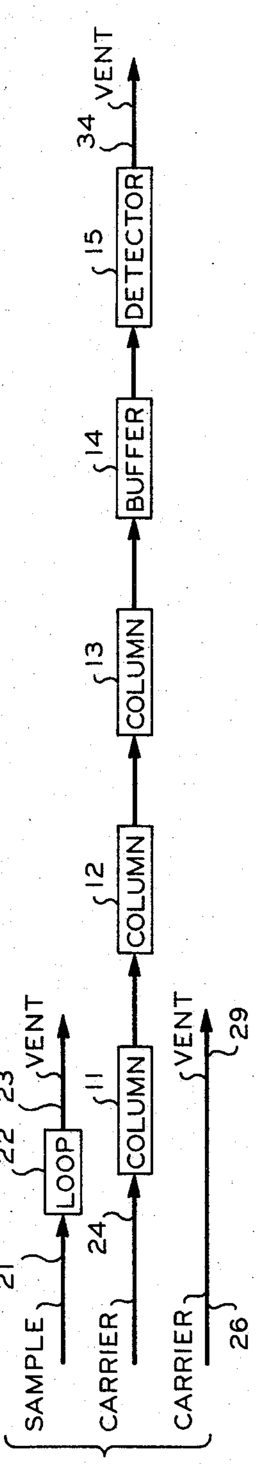
Figure 3:
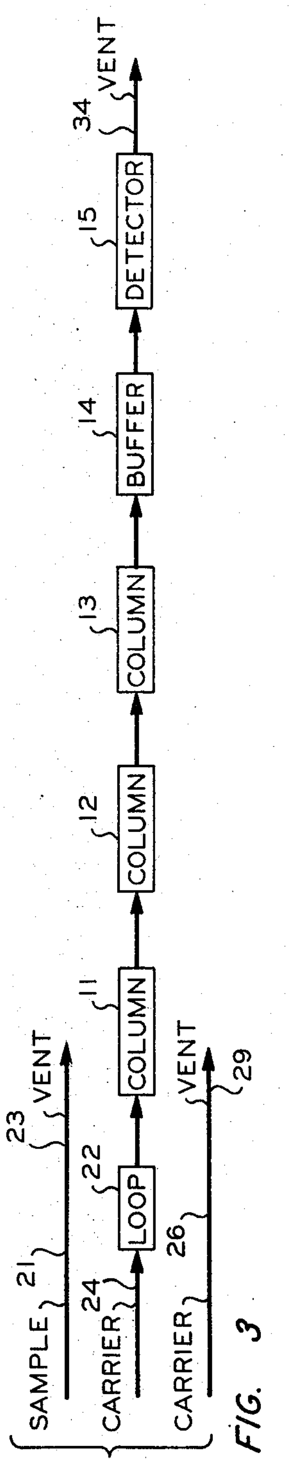
Figure 4:
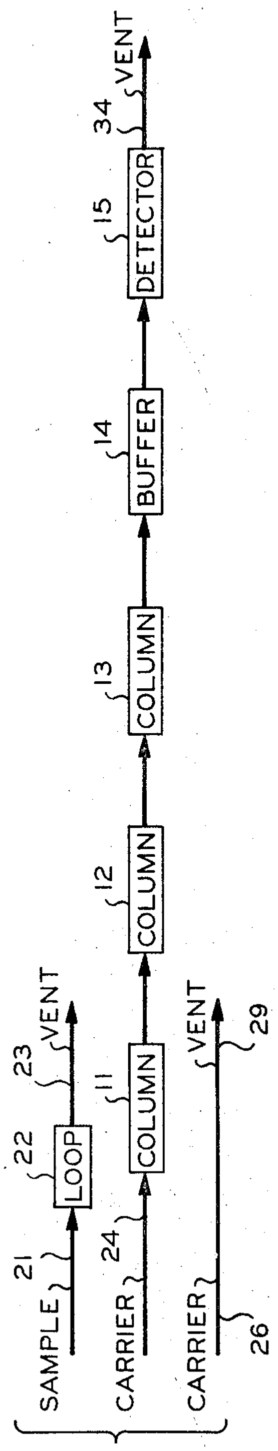

In the initial phase of an analysis cycle, the positions of valves 16, 17 and 18 are as illustrated by the solid lines in FIG. 1. The resulting flow paths are illustrated in FIG. 2 wherein the valve elements are omitted for sake of simplicity. Sample from conduit 21 flows through sample loop 22 to vent conduit 23. Carrier gas from conduit 26 flows to vent 29 while carrier gas from conduit 24 flows serially through columns 11, 12 and 13, buffer element 14 and detector 15 to vent 34. In the second phase, valves 17 and 18 remain in their initial or first positions, while valve 16 is actuated to its second position, represented by the dashed lines, in which carrier gas from conduit 24 pushes the sample from loop 22 out conduit 25 and conduit 21 is connected to vent conduit 23. The flow paths are illustrated in FIG. 3. In the third phase, valve 16 returns to its initial position, and the flow paths are illustrated in FIG. 4. In the fourth phase, valve 17 is actuated to its second position, represented by the dashed lines in FIG. 1. Carrier gas from conduit 24 passes through conduit 25 to backflush the contents of column 11 to vent conduit 29. Carrier gas from conduit 26 passes serially through columns 12 and 13, buffer element 14 and detector 15 to vent 34. The flow paths are illustrated in FIG. 5. In the fifth phase, valve 18 is actuated to its second position, represented by the dashed lines in FIG. 1 to reverse the position of columns 12 and 13 in the serial array, as illustrated in FIG. 6. At the end of the fifth phase valves 17 and 18 are actuated to their first positions and the system is ready for the start of a new first phase. Valve 27 can be adjusted to minimize disruptions in fluid pressure due to the change of valve 17 from its first position to its second position.

Referring now to FIGS. 7 and 8, there are illustrated the chromatographs for the analyses of a sample containing 5 weight percent carbon dioxide, 1 weight percent acetylene, 10 weight percent hydrogen, 2 weight percent argon and oxygen combined, 70 weight percent nitrogen, 2 weight percent methane and 10 weight percent carbon monoxide. The chromatograph of FIG. 7 was obtained with the system of FIG. 1 except for the omission of buffer element 14. The large peaks 41 and 42 on the negative side of base line 43 result from the pressure transients or disturbances caused by switching valve 18 from its second position to its first position and from its first position to its second position, respectively. The flat peaks represent the limit of the recording mechanism. The elution of the carbon dioxide through detector 15 shortly after valve 18 is actuated to its second position results in superimposing the carbon dioxide peak on the trailing edge of the negative disturbance peak. Thus the magnitude of the height of the carbon dioxide peak above, or on the positive side of, base line 43 is less than the true height of the carbon dioxide peak and its therefore inaccurate. Similarly, the integration of the portion of the carbon dioxide peak on the positive side of base line 43 results in an inaccurate value. In FIG. 8, the negative peaks 51 and 52 correspond to peaks 41 and 42, but the magnitude of the disturbances has ben minimized through the utilization of buffer element 14. The magniture of the disturbance represented by peak 52 has been reduced substantially to zero before the arrival of the carbon dioxide peak. In the chromatograph of FIG. 8, the height and area of the carbon dioxide peak above the base line 43 is accurate.

I claim:

1. In a chromatographic analysis system comprising a plurality of chromatographic columns connected in an array, having a sample input and a separated constituent outlet, each of said chromatographic columns containing a material that selectively retards passage therethrough of constituents of the fluid sample mixture to be analyzed, a chromatographic detector, and means for changing the connection of said plurailty of chromatographic columns in said array, the improvement comprising a buffer element connected between said outlet of said array and said detector, said buffer element being in the form of a conduit containing inert packing material, the effective free cross sectional area of said conduit being less than the effective free cross sectional area of said array so that said conduit acts as a flow restriction and promotes plug flow therethrough, said conduit being substantially free of any material which would effect significant separation of the constituents of said fluid sample mixture which pass through said conduit.

2. Apparatus in accordance with claim 1 wherein said array comprises at least two chromatographic columns connected in series and said means for changing comprises valve means for changing the position of said at least two chromatographic columns in the serial connection.

References Cited

UNITED STATES PATENTS 3,120,749 2/1964 Paglis et al. -------- 55—386 X

JAMES L. DE CESARE, Primary Examiner